Oct. 22, 1968   F. S. ARRAIZA   3,407,319
MAGNETIC BRAKES INCORPORATED IN ELECTRIC MOTORS
Filed Jan. 25, 1966                                    2 Sheets-Sheet 1

INVENTOR
FERMÍN SAGÜES ARRAIZA
BY ERIC Y. MUNSON
ATTORNEY

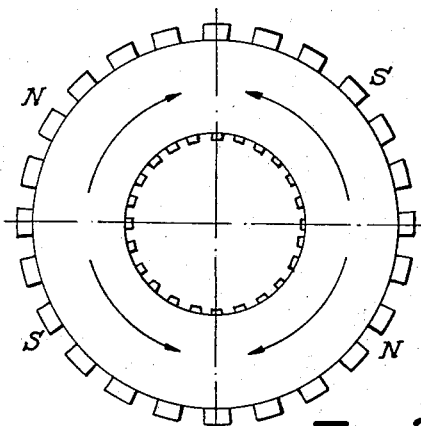
Fig. 3
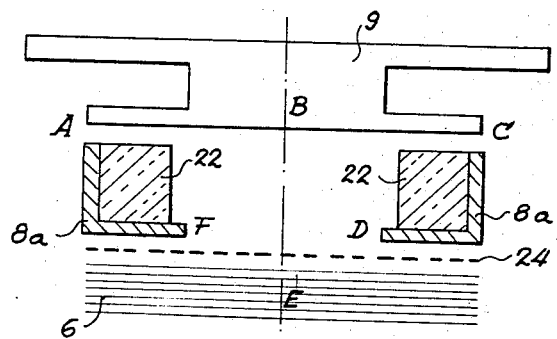
Fig. 4
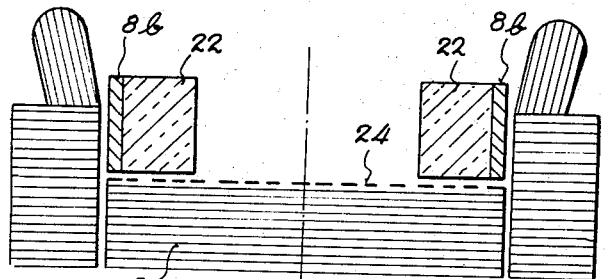
Fig. 5
INVENTOR
FERMÍN SAGÜES ARRAIZA
BY ERIC Y. MUNSON
ATTORNEY

United States Patent Office 3,407,319
Patented Oct. 22, 1968

3,407,319
MAGNETIC BRAKES INCORPORATED IN ELECTRIC MOTORS
Fermín Sagües Arraiza, Pamplona, Spain, assignor to Industrias Zaldi, S.A., Pamplona, Spain, a Spanish society
Filed Jan. 25, 1966, Ser. No. 522,956
Claims priority, application Spain, Feb. 3, 1965, 308,901
6 Claims. (Cl. 310—77)

The present invention refers to the brakes which are incorporated in electric motors with the aim of achieving a reduction in the stopping time of the said motors.

At the present time there exist braking devices incorporated into electric motors, which devices are intended for the same purpose and are generally constituted by a spring, the expansive force of which is exercised in the sense of applying a disc, which is integral with the shaft of the motor and capable of axial movement, against a fixed disc the spring of which is compressed during the operation of the motor by means of the force of attraction opposed to the action of the spring, generated by an electro-magnet or by an appropriate arrangement of the electrical circuit of the rotor, which determines the formation of the necessary magnetic field.

Also known are friction brakes in which the pressure between the two friction surfaces is effected by means of the attractive force of suitably arranged permanent magnets.

The present invention is an improvement on the above-mentioned magnetic brakes, but it is fundamentally different from those already known because of the fact that it is not essential to employ friction discs to effect the braking, since the braking is brought about by the contact between two ferromagnetic discoid elements which close the magnetic circuit of the magnets, the friction elements being completely secondary.

Another characteristic of the present invention is that the moving element is a plate of ferromagnetic material fitted in a form which makes it possible to graduate the gap between the polar piece and the support of the said piece.

Another characteristic of the invention is the fact of employing the ring which closes at one end the electric circuit of the rotor as a generator of magnetic flux antagonistic to the permanent magnets during the starting-up of the motor and which keeps the plate which constitutes the moving armature of the brake separate during the operation of the motor.

Another characteristic of the invention has as its object the arrangement of some ferromagnetic pieces applied against the front of the rotor which embrace the short-circuit ring of the said rotor and which are situated, at least in part, within the stator and arranged in a number equal to that of the grooves of the rotor, through which pieces and the corresponding plate there is closed the magnetic circuit antogonistic to the permanent magnetic flux.

Another characteristic of the invention is the fact that the circuit-breaker ring of the rotor presents some pieces of angular form regularly distributed, or an external casing of annular form made of ferromagnetic material, which pieces or casing, influenced by the rotor currents, deflect the magnetic field on their perimeter in such a way as to direct it axially thus bringing about the attraction or displacement of the brake plate.

With the aim of facilitating a better interpretation of the invention, there are shown in the attached drawings some practical forms for its industrial production. The said forms, as well as the corresponding description, are given merely by way of examples of an informative nature without in any way limiting the scope of the invention.

FIGURES 2 and 3 are respectively electrical diagrams of the rotor of a motor with one and two pairs of poles, and show the distribution of the rotor current.

FIGURE 4 represents a section of the end of the rotor in which there is shown the arrangement of the elements which direct the flux, in accordance with one form of the putting into practice of the invention.

FIGURE 5 shows a scheme similar to that represented in FIGURE 4, but with another form of arrangement of the elements which direct the flux.

Figure 1:
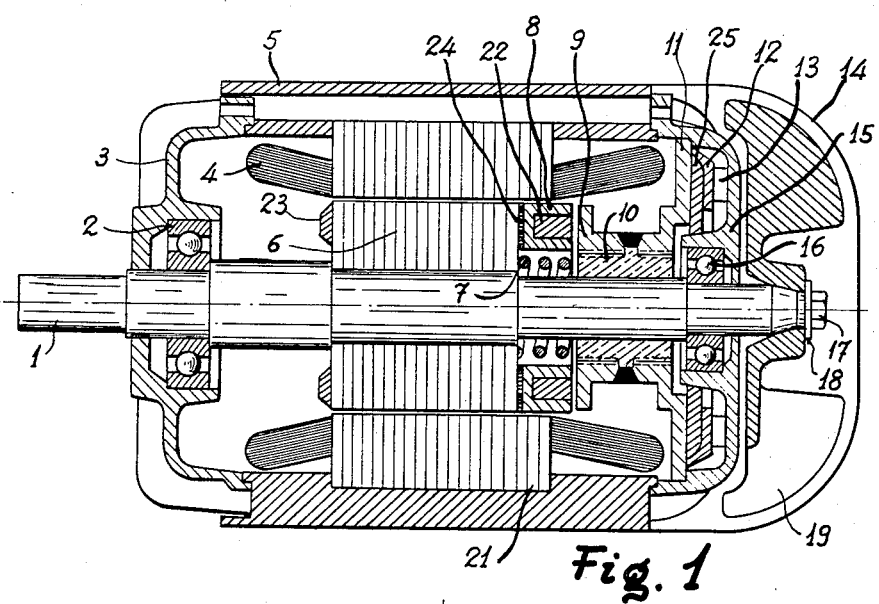
FIGURE 1 shows, in schematic form, a longitudinal section of an asynchronous electric motor equipped with the brake as described in the specification of the invention.

In FIGURE 1 the greater part of the motor corresponds to the normal form of construction, that is to say it consists of a shaft mounted on ball bearings 2 and 16 fixed to the supports 3 and 15 the shaft being coupled at one end to the fan 19 lodged in the shield 14, which is laterally closed by the frame 5 to which there are fixed the stator cores of magnetic sheet 21 with their corresponding coils 4. The rotor consists of the core 6 of magnetic sheet with the corresponding grooves for the longitudinal conductors, short-circuited at both ends by the rings 23 and 22, the latter being housed in the U-shaped pieces 8 fixed against the front part of the nucleus with the interposition of an antimagnetic sheet 24. These elements 8 are regularly distributed in a number equal to the grooves of the rotor.

The said anti-magnetic plate 24 is not absolutely essential, but it is advisable to have it fitted in normal applications.

The front of the rotor is situated in a position displaced towards the interior with respect to the front of the magnetic parts of the stator 21 in such a manner that the elements 8 partially project from the said front and form an annular cavity in which there is housed the spring 7 the interior end of which rests against the front of the core element 6.

On the part of the shaft 1 included between the ring 22 and the bearing 16 there is fitted in a manner susceptible to axial movement, but rotating with, a said shaft the sleeve 10 of non-ferromagnetic metal 10, which has a plate 11 fixed to its forward end and the plate 9 fixed to its posterior end, the latter plate being fixed by a screw-thread, so that by turning it it is possible to increase or reduce the separation between the fronts of the plates 9 and 11, with the aim of adjusting the end gaps.

The support 15 has fixed on its concave part the permanent magnets 13, which can also be a single annular piece, against which magnets there is fixed the fixed plate 12 equipped with a flange along the whole of its periphery, the said flange facing the movable plate 11.

The elements 15, 12 and 11 form part of a permanent magnetic circuit which is closed by means of the gap existing between the above-mentioned flange and the plate 11, so that the tendency of the latter plate is to press against the said flange and an annular notch near the edge of the supporting plate 15.

The concave part of the fixed plate 12 houses, although this is not fundamental for the invention, a ring 25 of material appropriate to constitute a friction surface which also serves to cushion the contact on the movable plate 11 being attracted.

Assuming that the motor is disconnected, the movable complex is in the position represented in FIGURE 1, that is to say attracted by the magnets 13 on being closed by the above-mentioned magnetic circuit.

On connecting the motor, there is established during the starting-up period a high degree of intensity in the rotor which is closed through the rings 22 and 23. The elements 8 situated respectively between two consecutive grooves constitute a magnetic armature in which there is concentrated the flux induced which, due to its great intensity, is closed through the gap existing between the two ends of the said element and the plate 9, producing an attractive force superior to that of the permanent magnets 13 so that the movable complex is separated from the plate 12 and becomes situated against the ends of the complex of elements 8, the rotor turning freely.

When the motor reaches its rated speed there is markedly reduced the magnetic field generated by the ring 22 on there being reduced the intensity of the current in the said ring, but, however, the movable complex remains attracted by the effect of the flux coming from the stator channeled by the partially interior positioning of the elements 8 with respect to the stator.

When the motor is disconnected, the spring 7 which exercises a slight pressure on the movable complex in the sense of approximating it to the fixed plate 12, impels the said movable complex towards a position in which it is attracted by the permanent magnetic field, so that it rests against the edge of the said plate 12 producing the desired braking effect.

The spring 7 can be omitted in some cases, for instance when with fixed cycles it is possible to reduce the axial movement of the movable complex to very small values on its being possible for the disc 11 to turn within the zone of influence of the magnet.

The adjustment between the gap situated between the flange of the plate 12 and plate 11 is fundamental for the good functioning of the brake, for which purpose the said adjustment is easy to effect by moving the plate 9 with respect to the sleeve 10 in the form mentioned above and fixing it in the determined position.

As a variant in the implementation of the invention, the plate 11 or the plate 12 may have grooves or whatever form may determine a variation of the intensity of the field in the periphery to obtain a more active braking through the effect of parasitic currents induced by the movement of both plates during the process of braking.

In accordance with the invention, the pieces which form the casing in the form of a U, 8, which house the ring of the circuit-breaker, 22, may adopt other forms, and may even be substituted by an external casing ring.

Figure 2:
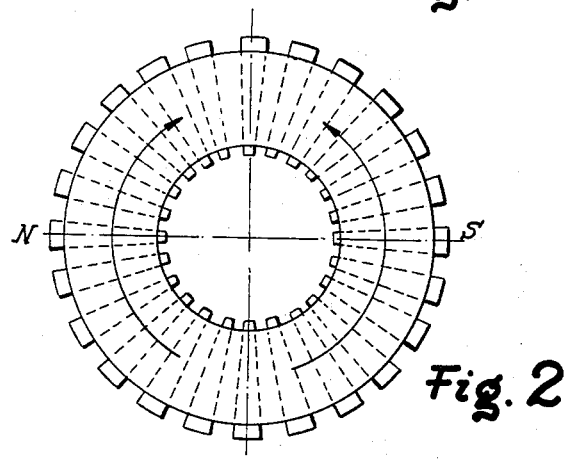

As is shown in FIGURES 2 and 3, the rotor current circulates through the circuit-breaker rings, being divided into an even number of branches whatever the number of pairs of poles may be. This rotor current generates a flux which, in accordance with the terms of the invention, serves to keep the movable armature of the brake attracted.

In the form of construction of the invention shown in FIGURE 4, the plate 9 is fitted in a form susceptible to being displaced axially along the shaft, and is claimed in the sense that it is caused to draw near to the permanent magnet by a spring which is coaxial with respect to the shaft, but which is not shown in the figure.

The ring, 22, has applied to its external and posterior faces the armature of ferromagnetic metal, 8a, which has the form of an L. In accordance with this arrangement, the magnetic flux produced by the extra starting current is closed through the circuit A–B–C–D–E–F–A, jumping the air gaps which exist between D and F, either directly or through the core, 6, according as to whether the sheet of antimagnetic material, 24, is in place or not.

As a result of this arrangement, when the motor operates with no load, or with small loads, the brake continues to be retained by the effect of the flux deflected from part of the stator, as is described in the main patent, since in this process there takes part only the upper branch of the piece 8a.

In accordance with another form of construction of the invention, shown in FIGURE 5, the circuit-breaker ring, 22, is covered on its outer part by another ring of ferromagnetic material, 8b. In this case the grooves which separated the pieces 8a are eliminated, since in certain cases the induced current is sufficient, even in a vacuum, to direct the fluxes which reach its vicinity, a sufficient attraction to the plate, 9, being obtained.

There having been sufficiently described the invention, as well as various examples of its practical construction, it only remains to add that in the said examples it is possible to introduce variations of form and arrangement, provided that such alterations do not substantially change the object of the invention.

What is claimed is:

1. A magnetic brake for incorporation in electric motors comprising, a fixed plate joined to the stator of the motor and a plate joined to the rotor and rotative with it, the latter plate having axial movement, the plate on the stator being of annular form and having permanent magnets on it, said plate constituting a cover that houses the fixed plate and the magnets in a manner to provide a fixed armature that terminates in two annular concentric zones, the inner of which is formed by an edge of the plate that carries the magnets, and the outer zone being formed by an inner cut in the cover, the rotor-bearing plate being borne by the motor shaft being applied by magnetic attraction against said zones to thereby establish a magnetic circuit generated by the permanent magnets closed transversely at the periphery of the assembly by a cut in the support and the edge of the fixed plate and the peripheral zone of the movable plate.

2. A magnetic brake according to claim 1, wherein the rotor has a plurality of grooves, a plurality of small U-shaped armatures corresponding in number to said grooves, and rings on the rotor short-circuiting conductors of the rotor.

3. A magnetic brake according to claim 2, wherein the armatures holding the short circuit rings are at least partly situated within the stator for the purpose of concentrating part of the magnetic flux proceeding from the stator to maintain the position of the movable plate during the operation of the motor.

4. A magnetic brake according to claim 2, wherein a ring of the rotor has an external part surrounded by a ring of ferro-magnetic material which is influenced by rotor currents and deflects a magnetic field axially to thereby maintain the movable plate in a displaced position.

5. A magnetic brake according to claim 2, wherein the force necessary for the unblocking of the brake is provided by the magnetic attraction generated in a plurality of small U-shaped armatures fixed against the front end of the rotor in a number equal to that of grooves provided in said rotor, which armatures house one of the rings which short circuit the conductors of the rotor.

6. A magnetic brake according to claim 1, wherein the movable plate includes a sleeve of ferro-magnetic material fitted on the shaft of the rotor and which turns with said shaft and is also capable of axial movement relatively to the shaft, said sleeve bearing two opposite end plates, one of which end plates constituting the moving armature of the permanent magnetic circuit and the other constituting the armature of the electromagnetic circuit for causing the application of the brake and for maintaining it in operation.

References Cited

UNITED STATES PATENTS

| | | | |
|---|---|---|---|
| 3,335,304 | 8/1967 | Brongersma | 310—77 |
| 3,037,133 | 5/1962 | Peach | 310—77 |
| 3,032,667 | 5/1962 | Sorchy | 310—77 |
| 2,802,121 | 8/1957 | Sorchy | 310—77 |
| 2,809,309 | 10/1957 | Evans | 310—77 |
| 2,827,136 | 3/1958 | Sorchy | 310—77 |
| 2,879,417 | 3/1959 | Sorchy | 310—77 |
| 2,536,491 | 7/1951 | Chapman | 310—77 |
| 2,480,291 | 8/1949 | Gerentes | 310—77 |

J. D. MILLER, *Primary Examiner.*